Dec. 15, 1964  E. D. APPLETON  3,161,388
FAN MOUNTINGS
Filed Feb. 18, 1963  2 Sheets-Sheet 1

Inventor
Eric David Appleton
By
Guston H. Emery Atty.

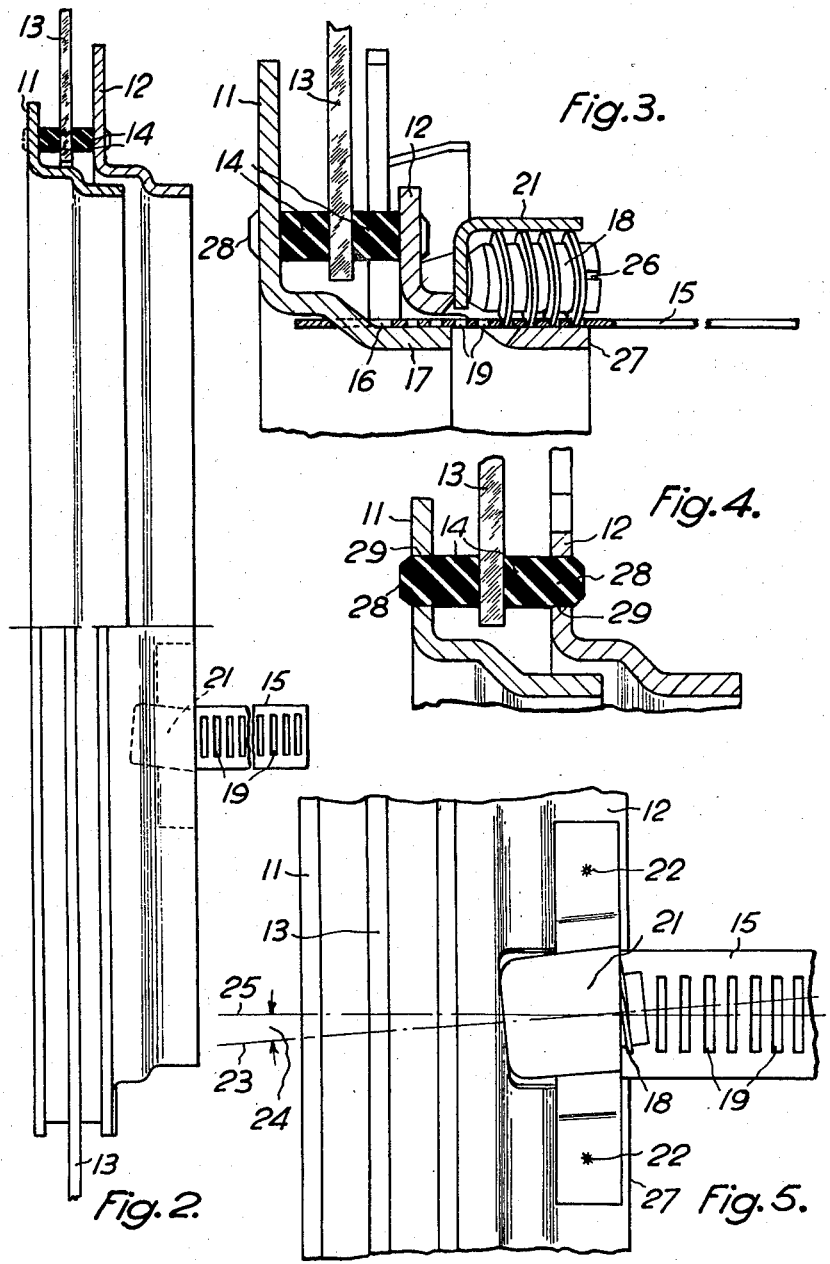

# United States Patent Office 3,161,388
Patented Dec. 15, 1964

3,161,388
FAN MOUNTINGS
Eric D. Appleton, Colchester, England, assignor to Woods of Colchester Limited, Colchester, England, a British company
Filed Feb. 18, 1963, Ser. No. 259,240
Claims priority, application Great Britain, Feb. 28, 1962, 7,858/62
6 Claims. (Cl. 248—2)

When ventilating fans are mounted in window panes or in walls the mounting commonly comprises a pair of annular clamping plates held in engagement with the periphery of the aperture in which the fan is located by clamping bolts extending through the aperture.

This invention has for an object the provision of a mounting of this kind which is simple and cheap and the clamping plates of which may be of very narrow radial dimensions, thus allowing a greater fan efficiency to be obtained for a given size of aperture or a given degree of obscuration of a window.

According to the invention the clamping plates of a fan mounting are secured together by metal strips which are tensioned where the strips engage at least one of the clamping plates.

One manner in which the strips may be engaged is to provide arcuate depressions or slots in the strips which can be engaged by the thread of a worm or the like carried upon one of the clamping plates. Then by rotation of the worm the strip can be tensioned. The depressions or slots may extend at right angles to the longitudinal axis of the strip the worm being set at the pitch angle of the worm threads to the length of the strip.

Alternatively plain strips may be used secured to at least one of the clamping plates in a manner such that the securing of the strip serves also to tension it. For example the strip may be passed through slots in the opposed arms of a rectangular-shaped member and a clamping bolt may deform the strip to both clamp and tension it.

The securing strip may pass through slots in each of the clamping plates which locate the strip parallel to and closely adjacent the wall of the fan-containing aperture. The strip will occupy very little space in the aperture and in consequence a neat mounting is provided in which substantially the whole of the aperture can be used as or can be used to contain the fan duct. In addition the strip can easily be provided in any desired length or with some arrangements can be provided in continuous lengths and the excess of strip can be readily trimmed off when the clamping plates are secured in position.

Whilst if desired a worm or similar strip engaging member may be provided upon each clamping plate so that the strip can be tightened from either side it is usually preferred to provide tensioning means upon only one of the clamping plates whilst the strip is anchored in the other. If finite lengths of strip are provided they may be apertured at one end and the aperture may engage a hook or tongue provided upon the clamping plate, or each may be passed through a slot and turned over upon itself so that the enlargement will not pass through the slot and will provide a suitable anchor; the latter scheme can also be used for strips cut from a continuous length of material.

The clamping plates may each be in the form of an annular ring.

In order that the invention may be clearly understood some embodiments thereof will now be described by way of example only, with reference to the accompanying diagrammatic drawings in which:

FIGURE 2 is a part section through a fan mounting showing the fan mounted in an aperture in a glass window;

FIGURE 3 is an enlarged detail showing a section of the means of securing the clamping plates together;

FIGURE 4 is a detail showing the location of a gasket relative to the clamping plate;

FIGURE 5 is a detail of a strip tensioning means;

FIGURE 7 is a cross section of a modified means of securing the clamping plates together.

Figure 1:
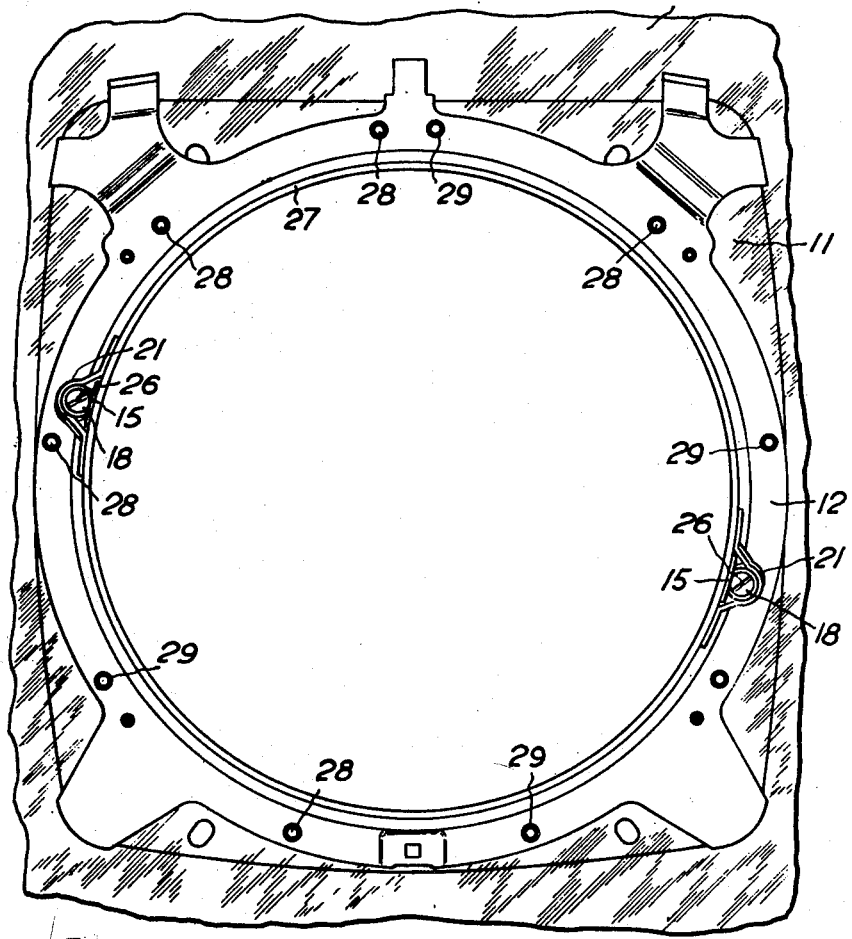
FIGURE 1 is an end view of the clamping plate of a fan mounting according to the invention.

In the drawings a fan mounting is illustrated which comprises an outer clamping plate 11 and an inner clamping plate 12 which are clamped in sealing relationship about the periphery of a circular aperture cut in a glass window 13, resilient sealing gaskets 14 being interposed between the clamping plates and the glass.

Figure 6:
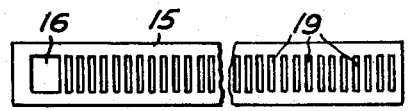
FIGURE 6 shows a tensioning strip for use to secure the clamping plates together.

The clamping plates are held in position by metal strips 15 which are formed with an aperture 16 in one end (FIGURE 6) which engages a lug 17 integral with the clamping plate 11 the strips being engaged and tensioned by a worm 18 carried by the clamping plate 12. The tensioning strips are rectangular strips of metal such as cadmium plated steel having an anchor-engaging aperture 16 in one end and a series of parallel slots 19 extending transversely at right angles to the longitudinal axis of the strip. The slots 19 may be pierced in the strip or alternatively they may be arcuate in form and may be milled in the surface of the strip and the separation between the slots is equal to the pitch of the screw threads on the worm 18. For most purposes the strips 15 may be made in two standard lengths one for use when the mounting is to be secured on to a panel of small thickness such as a window or a thin metal bulkhead and longer strips for use when the mounting is to be fastened about an aperture in a wall such as a brick wall. In any case the length of the strips is not critical since any excess length can be trimmed off once the mounting is in place.

The worm 18 may be supported within a housing 21 which may be a simple metal pressing and which may be secured to the inner clamping plate 12 by means of spot welds 22 or other suitable means. The housing is conveniently arranged so that the axis 23 of the worm makes an angle 24 to the axis 25 of the clamping plates equal to the pitch angle of the threads of the worm. Alternatively the worm can be mounted with its axis parallel to the axis of the clamping plates but in this case the slots 19 in the strips 15 must be cut at an angle equal to the pitch angle and the metal strips must be threaded into engagement with the worm with the slots extending in the same direction as the worm threads. Other angular arrangements are also possible. The strips may then be tensioned and the clamping plates compressed into secure engagement with the surface to which the fan mounting is to be secured by rotating the worm, for example by means of a screwdriver slot 26, to tension the strip 15. When the clamping plates are located in their final position any excess length of the strip 15 may be removed flush with the surface 27.

The gaskets 14 may conveniently be of rubber or a synthetic material having similar physical properties. If the gaskets are moulded they may be formed with a number of integral pips 28 which may locate in apertures 29 in order to correctly position the gasket (FIGURE 4). In the arrangement illustrated in FIGURE 1 ten moulded pips 28 and corresponding apertures 29 are provided.

Alternatively the gasket may be located by providing a turn over edge or bead on the outer periphery of the clamping plates 11 and 12. In this case the gasket will be retained within the channel formed by the bead and the gasket may be made up of plain material of round square or other solid or tubular section which may if desired be cut from continuous extruded lengths.

Instead of providing the anchoring aperture 16 one end of the strip may be anchored by turning over the end 30 upon itself and feeding the strip through a slot 31 in one of the clamping plates which will not allow the doubled over end to pass as shown in FIG. 7. In this case continuous lengths of strips may be provided which may be cut to any required size.

A still further alternative allows the use of a plain metal strip cut from continuous lengths. In this case one end of the strip may again be doubled over and threaded through an aperture to provide an anchor. The free end of the strip may be threaded through slots in the opposite limbs of a U-shaped bracket and both clamped and tensioned by suitable means such as a bolt which forces the strip out of alignment with the slots in the bracket.

It will commonly be preferred that the clamping plates of the fan mounting according to the invention are made of aluminium whilst the tensioning strip and worm are of steel, which may be cadmium plated for the sake of protection from corrosion. Other materials may however be used and the clamping plates may if desired be moulded from a suitable rigid synthetic material.

I claim:
1. A mounting to support a fan in an aperture in a window pane or wall comprising a pair of annular clamping plates held in engagement with the periphery of the aperture in which the fan is to be located, metal strips engaging at least one of the plates to secure them clampingly together, and tensioning means for the strips comprising slots in each strip and a worm secured on one of the clamping plates for each strip to engage the slots therein.

2. A mounting according to claim 1, in which a lug is provided on one of the clamping plates and each strip is apertured to engage the lug to anchor it thereto.

3. A mounting to support a fan in an aperture in a window pane or wall comprising a pair of annular clamping plates held in engagement with the periphery of the aperture in which the fan is to be located, metal strips engaging at least one of the plates to secure them clampingly together, and tensioning means for the strips comprising slots in each strip and a worm secured on one of the clamping plates for each strip to engage the slots therein, and a resilient sealing ring to be positioned between the clamping plate and the surface against which this is to be mounted and which is moulded with a number of integral moulded pips which will engage within corresponding apertures in the clamping plates when the parts are assembled together.

4. A mounting according to claim 1 wherein the slots extend at right angles to the longitudinal axis of the strip and the worms with which they interengage are mounted with the axes at an angle to the axis of the clamping plates corresponding to the pitch angle of the threads of the worm.

5. A mounting according to claim 1 in which one end of each strip is turned through 180° upon itself and the strip is threaded through a slot in one of the clamping plates which will not allow the doubled over portion of the strip to pass to thereby anchor one end of the strip.

6. A mounting according to claim 1 in which a housing is provided for the worm and made up of the clamping plate and a bracket secured to the clamping plate.

References Cited in the file of this patent
UNITED STATES PATENTS

| | | |
|---|---|---|
| 2,442,754 | Beam | June 8, 1948 |
| 2,933,241 | Braskamp | Apr. 19, 1960 |
| 2,974,878 | Norling | Mar. 4, 1961 |
| 3,052,065 | Rettman | Sept. 4, 1962 |

CLAUDE A. LE ROY, *Primary Examiner.*